United States Patent
Pina et al.

(10) Patent No.: US 7,427,083 B2
(45) Date of Patent: Sep. 23, 2008

(54) DEVICE FOR FIXING A CLAMP TO A HOSE

(75) Inventors: Antonio Carlos Pina, Sao Paulo (BR); Marco Antonio Vieira De Campos, Sao Paulo (BR)

(73) Assignee: Progeral Industria de Artefatos Plasticos LTDA, Sao Paulo (BR)

( * ) Notice: Subject to any disclaimer, the term of this patent is extended or adjusted under 35 U.S.C. 154(b) by 0 days.

(21) Appl. No.: 10/503,374

(22) PCT Filed: Feb. 1, 2002

(86) PCT No.: PCT/GB02/00020

§ 371 (c)(1),
(2), (4) Date: Feb. 24, 2005

(87) PCT Pub. No.: WO03/064913

PCT Pub. Date: Aug. 7, 2003

(65) Prior Publication Data

US 2005/0146132 A1 Jul. 7, 2005

(51) Int. Cl.
*F16L 55/00* (2006.01)
(52) U.S. Cl. .......................... 285/23; 285/420
(58) Field of Classification Search ............ 285/23, 285/420
See application file for complete search history.

(56) References Cited

U.S. PATENT DOCUMENTS

| 5,405,170 | A | | 4/1995 | Roulinson et al. |
| 5,620,209 | A | * | 4/1997 | Sauer ........................... 285/23 |
| 5,675,871 | A | * | 10/1997 | Webb et al. .................... 285/23 |
| 5,749,603 | A | * | 5/1998 | Mann .......................... 285/23 |
| 5,820,166 | A | * | 10/1998 | Webb ........................... 285/23 |
| 5,915,739 | A | | 6/1999 | Cradduck et al. |
| 6,343,772 | B1 | * | 2/2002 | Oi ................................ 285/23 |
| 6,701,581 | B2 | * | 3/2004 | Senovich et al. ............. 285/252 |

FOREIGN PATENT DOCUMENTS

EP 1 033 519 A 9/2000

* cited by examiner

Primary Examiner—David E Bochna
(74) Attorney, Agent, or Firm—TraskBritt, P.C.

(57) ABSTRACT

A device for fixing a clamp to a hose comprising a body (2) a hose-fixing component (4) provided with a hose-embracing region (3), the hose-fixing component (4) comprising a first open fixation portion (5) and a second open fixation portion (5'), the first and second open fixation portions (5, 5') being positioned adjacent to each other, jointly defining the hose-embracing region (3) and being moveable from an initial position varying the extent of the embracing region (3).

15 Claims, 2 Drawing Sheets

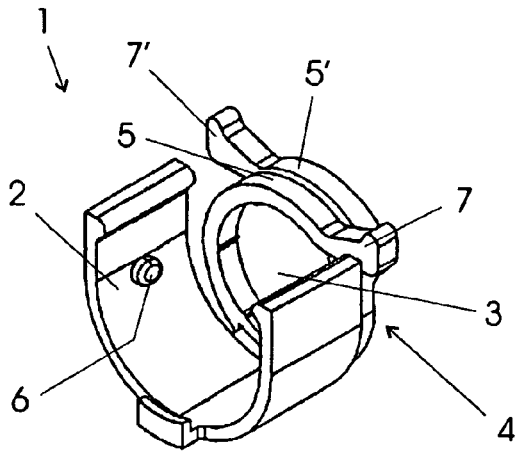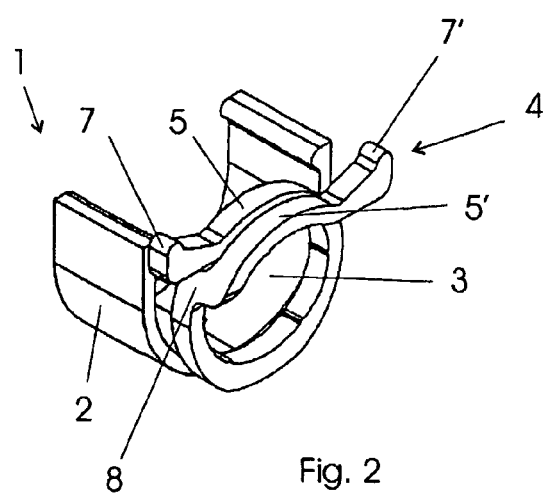
Fig. 1　　　　　　Fig. 2
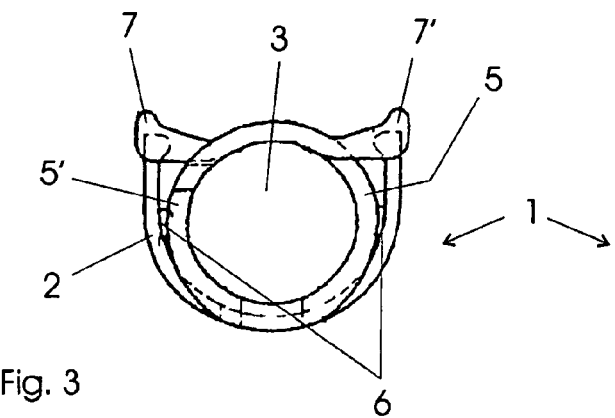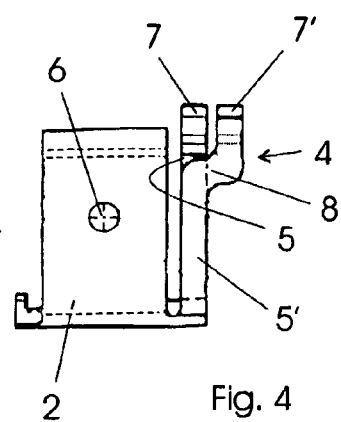
Fig. 3　　　　　　Fig. 4
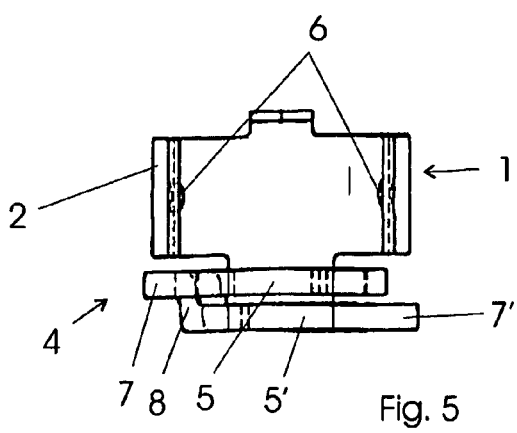
Fig. 5

DEVICE FOR FIXING A CLAMP TO A HOSE

The present invention relates to a device for fixing a clamp to a hose particularly for use with clamps of automotive vehicles, a clamp-fixing component and a hose provided with a device for fixing a clamp.

DESCRIPTION OF THE PRIOR ART

Conventionally, claims for use on hoses of automotive vehicles, as for example water hoses for cooling the engine, fuel hoses and hydraulic-system hoses, are those provided with a screw that is tightened or loosened so as to tighten or loosen the clamp, thus enabling one to place or remove the hose with respect to the nozzle on which it is installed.

However, at the time of manufacturing the vehicles, these clamps presented the drawback of taking too long to be tightened, thus generating a delay at the production line, especially if the location of the clamp was such that it would make it difficult to use tools such as screwdrivers. This situation began to prove unsustainable, as the space intended for the mechanical components of the vehicles became more and more exiguous.

Another problem encountered in this solution was the need to position the clamp adequately, so as to prevent it from rotating so that the screw could no longer be actuated, which would require one to reposition the clamp on the hose, with all the drawbacks mentioned above.

With a view to eliminate these drawbacks, a number of clamps were proposed to replace the screw with other systems, such as for example locking surfaces, teeth, notches or recesses, in order to bring about more ease, above all with regard to the tightening of the clamp, since it was necessary to use a special tool such as pliers for loosening an already installed clamp.

However, the ease and rapidity of fixing hoses with these clamps at the vehicle assembly line caused them to be widely used, even with the drawback of the need for a special tool to open the clamp in the event that it would be wrongly mounted. To make things worse, these clamps were damaged during this attempt to open them, because they were not designed to opened and closed repeatedly.

Since it continued not to be interesting for the hose to rotate on the clamp before or during its installation on the vehicle, one resorted to an adhesive that would fixe the open clamp onto the hose, in a predetermined correct position. However, this procedure is extremely inefficient, since the clamp may shift from the hose before it is mounted on the vehicle, there are difficulties in applying the adhesive, it is expensive and there is the need for a complementary step to apply it. All these drawbacks still caused troubles in using clamps glued to the hoses.

A first attempt at eliminating these drawbacks is made in U.S. Pat. No. 5,820,166, which discloses a hose-positioning device comprising a C-shaped body that "embraces" the clamp, provided with a plurality of end protrusions located on the inner surface so as to position the clamp correctly between these ends, thus preventing it from moving. Although it functions satisfactorily, it has little operational flexibility, since the design and positioning of the protrusions are determined by the clamp to be used, which limits the use thereof to that clamp shape.

A second attempt at eliminating these drawbacks is made in U.S. Pat. No. 5,675,871, which discloses a clamp-positioning device provided with a C-shaped body comprising two spring rings positioned at the ends, so that the hose remains located inside the circumference defined by the two rings, which still press the hose, so as to prevent them from moving radially with respect to it. On the inner surface of the body there are two protrusions for engagement and limitation of rotary motion of the clamp. In spite of solving the problem of fixation, this creates another problem, that is to say, it is necessary to use a cone for opening the rings and enable one to place the hose. This additional placing step causes a productive trouble that is so great as the application of glue used in the conventional method, also causing a great drawback. Therefore, one problem was solved and another was created.

A third attempt at eliminating these drawbacks is in U.S. Pat. No. 5,915,739, which discloses a clamp-retaining device comprising the clamp itself, but the clamp additionally has a prolongation in the axial direction, this prolongation comprising a positioning component in the form of a C-shaped spring, which locks the hose with force sufficient only to prevent the device from moving rotationally. In spite of functioning satisfactorily, this device has a considerable longitudinal length, which makes it unfeasible to use it at short stretches of hose; besides, it is weak and expensive to manufacture due to its constructive geometry.

A fourth attempt at eliminating these drawbacks is in EP 1 033 519, which discloses a hose clamp with positioning function. According to the teachings of this prior art reference, a detent formed a circular pert which is separate by an expanding slot into two parts. The inner portion of the detent is provided with biting protrusions which engage with the hose. Although this solution might provide a solution to fix a clamp to a hose, to mount it, the user will have to force the passage of the hose through the detent which will be dragged over the hose to force the opening of the slot. This procedure demands careful mounting of the detent being time-consuming.

OBJECTIVES OF THE INVENTION

The objective of the present invention is to provide a device for fixing a clamp to a hose, which is easy to produce, has a reduced manufacture cost and is easy to operate, thus preventing the clamp to rotate with respect to the hose and enabling one to close the clamp easily.

A second objective of the present invention is to provide a hose-fixing component for use with the hose-fixing device of the present invention, which provides all the advantages mentioned above.

A third objective of the present invention is to provide a hose provided with a device for fixing the clamp to the hose, which has the advantages described above.

BRIEF DESCRIPTION OF THE INVENTION

The objectives of the present invention are achieved by means of A device for fixing a clamp to a hose, comprising a body and a hose-fixing component provided with a hose-embracing region, the hose-fixing component comprising a first open fixation portion and a second open fixation portion, the first and second open portions having a handling end and are positioned adjacent to each other, jointly define the hose-embracing region and are moveable from an initial position varying the extent of the embracing region.

Also, the objectives of the present invention are achieved by means of a hose-fixing component provided with a hose-embracing region and comprising a first open fixation portion and a second open fixation portion, the first and second open fixation portions having a handling end and are positioned adjacent to each other, jointly define the hose-embracing region and are moveable from an initial position varying the extent of the embracing region.

Further, the objectives of the present invention are achieved by means of a hose, particularly for use with fluids, comprising a clamp-positioning device, as defined above.

The present invention has the advantage of providing means for fixing a clamp to a hose, enabling one to mount the hose easily on the component where it is to be installed, without the possibility of the hose moving rotationally, which would entail further work of positioning this clamp again.

With regard to clamps glued to the hose, the present invention has the advantages lower cost and incomparably higher reliability, since the clamp cannot separate from the hose, which often occurs when the clamp is glued.

With regard to the devices known from the prior art, the present invention has the advantages of functionality, since the first and second opened fixation portions may be moved by hand, without the need for additional mechanized steps for effecting this opening, and of flexibility of use, since it has a shorter longitudinal length by virtue of the fact that it presents only one hose-fixing component, instead of two, whereby it can be used with short hoses.

BRIEF DESCRIPTION OF THE DRAWINGS

The present invention will now be described in greater detail with reference to an embodiment represented in the drawings. The figures show:

FIG. 1: a first perspective view of a preferred embodiment of the device for fixing a clamp to a hose of the present invention;

FIG. 2: a second perspective view of the device illustrated in FIG. 1;

FIG. 3: a back view of the device illustrated in FIGS. 1 and 2;

FIG. 4: a side view of the device illustrated in FIGS. 1 to 3;

FIG. 5: a top view of the device illustrated in FIGS. 1 to 4;

DETAILED DESCRIPTION OF THE FIGURES

Figures 6, 7:
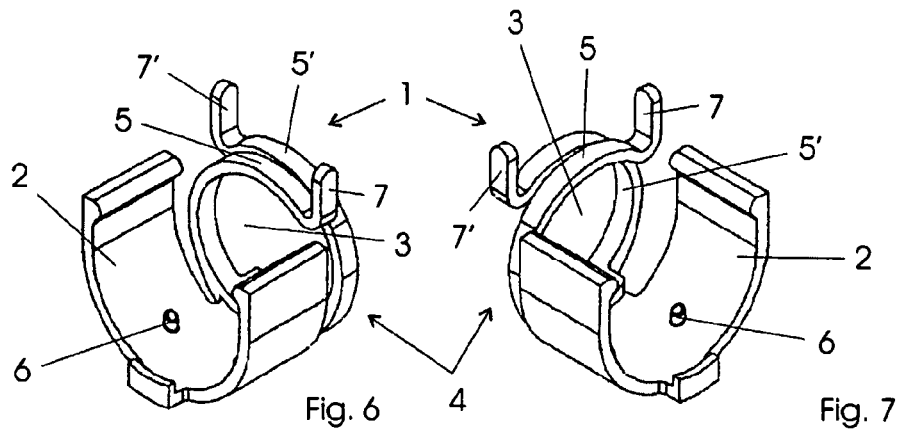
FIG. 6: a first perspective view of an alternative embodiment of the device for fixing a clamp to a hose of the present invention.
FIG. 7: a second perspective view of the device illustrated in FIG. 6.

As can be seen from FIG. 1, the present invention comprises a device for fixing a clamp (not shown) to a hose (not shown either), comprising a body 2 for fixing the clamp and a component for fixing the hose 4.

The body 2 preferably is open and semicircular or C-shaped and has, on its inner surface, two substantially semispherical protrusions 6. The clamp that will fix the hose onto the nozzle where it should be installed is positioned on this inner surface of the body 2, which supports it, and remains locked by the two protrusions 6, designed and positioned in such a way that they fit into recesses or bores of the clamp so as to prevent it from rotating. In this way, there will be no motion of the clamp with respect to the body 2.

Evidently, the shape, positioning and the number of protrusions 6 may vary, depending upon the parameters of the project. Also, another type of protuberance may be foreseen, as for example fitting tongues, or else any other that presents the claim from moving with respect to the body 2.

The body 2 being C-shaped, the hose will be located in such a way, that the inner surface of the body 2 will involve it by means of the clamp. However, the body 2 may evidently assume other different shapes, the only limitation being the fact that this shape should enable one to fix the clamp without it rotating. Optionally, the longitudinal ends of the body 2 has a shoulder that helps in fixing the clamp and the hose.

Close to a first transversal end of the body 2, there is a component for fixing the hose 4, which comprises a first open fixation portion 5 and a second open fixation portion 5', arranged axially parallel, axially aligned and adjacent to each other (arranged side by side).

From the first transversal end of the body 2 first and second open fixation portions 5, 5' projects, which configure the component for fixing the hose 4. In the preferred embodiment of the present invention, the first open fixation portion 5 has a substantially semicircular and plane shape, and has a first end region associated to the body 2 and a second end region provided with a first handling end 7. The first open fixation portion 5 is plane, since it defines a single plane in the transversal direction. By the way, a first transversal end of the first open fixation portion 5 is adjacent and parallel to the first transverse end of the body 2, and the second transverse end of this same first portion 5 is opposite to the first one.

The second open fixation portion 5' is also substantially semicircular or C-shaped, and comprises a first end region associated to the body 2 (positioned "face-to-face" with the first end region or the first open fixation portion 5) and a second end region provided with a second handling end 7'. However, the first and second open fixation portion 5,5' have a semicircular shape with over 180° each, and in order to avoid overlapping between them, an intermediate region of the second portion 5' has a deviation 8, so that the remainder of this portion, towards the second handling end 7', is out of alignment, positioned more outwardly, thus enabling both fixation portions to be accommodated without any interference at all. Preferably, the region at the back of the deviation 8 in the direction of the second handling end 7' is parallel to the first portion 5 and to the region between the first end region and the deviation 8 of the second portion 5'.

Said two fixation portion 5, 5' delimit a region embracing the hose 3, which enables one to fix the device 1 to the hose. The detailed functioning of the device 1 will be commented below, after the invention has been totally described.

Figures 8, 9:
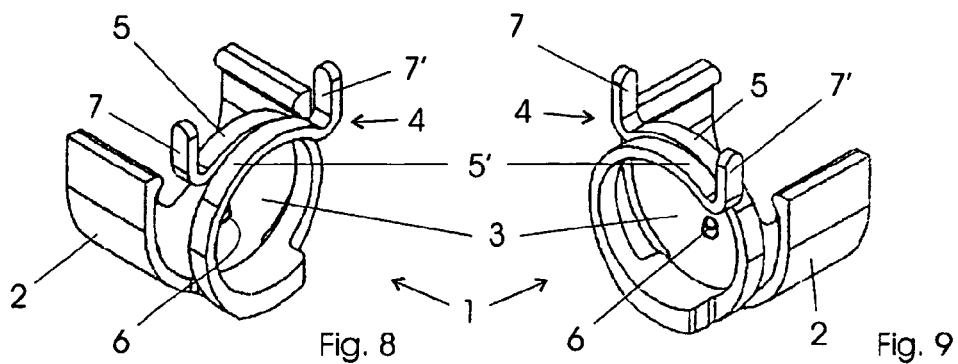
FIG. 8: a third perspective view of the device illustrated in FIGS. 6 and 7.
FIG. 9: a fourth perspective view of the device illustrated in FIGS. 6 to 8.
Figures 10, 11:
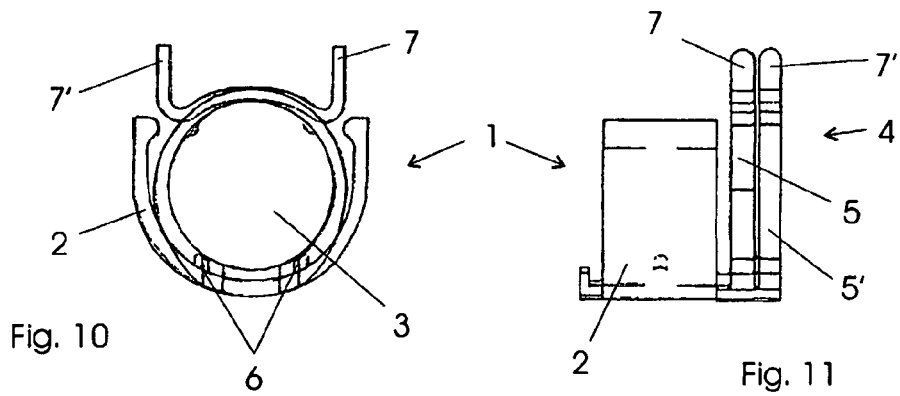
FIG. 10: a front view of the device illustrated in FIGS. 6 to 9.
FIG. 11: a side view of the device illustrated in FIGS. 6 to 10.
Figure 12:
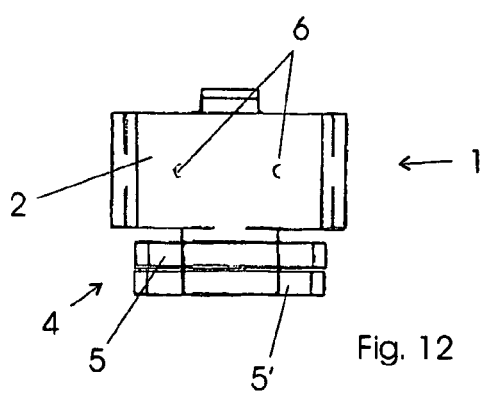
FIG. 12: a bottom view of the device illustrated in FIGS. 6 to 11.

As can be seen from FIG. 6-12, an alternative embodiment may comprise the first and second open fixation portions 5, 5' in axial parallelism, axial alignment and adjacent to each other, so that both portions will be parallel and side by side. For this purpose, the first transverse end of the first open fixation portion 5 is adjacent and parallel to the first transverse end of the body 2, and the second transverse end of this same portion 5, which is opposite the first one, is adjacent to the first transverse end of the second open fixation portion 5', the first transversal end of this second fixation portion configuring the free end of the component for fixing the hose 4. Also in this alternative embodiment, the first and second open fixation portions 5, 5' define a region embracing the hose 3. It should be noted that this embodiment functions just as the preferred embodiment.

Evidently, the shape of the first and second open fixation portions 5, 5' may be different, provided that they limit a region embracing the hose 3.

The device 1 of the present invention may be manufactured from steel, plastic, or any other material that meets the project requirements.

The functioning of the device 1 for fixing the clamp to a hose of the present invention is based on the principle of elasticity of the material of the fixation portion 5,5'.

When the device 1 is at rest and without clamp, both first and second fixation portions 5, 5' are also in the natural position, delimiting an initial region embracing the hose 3. In order for the device 1 to be functional, the initial hose-embracing region must have a dimension (area) lesser than that of the second cross-section of the hose that is associated thereto.

To be mounted at the desired location, the device 1 should receive the clamp in the inner surface, the clamp being open (that is to say, not tightened, wide, loosened), so as to enable one to place the hose at the place where it is to be fixed. This place may be a vehicle engine or a heat exchanger or a fluid pump, etc.

With the clamp positioned and open, one inserts the hose, which passes through the embracing region 3 and through the inside of the clamp, so that its free end will be comprised or embraced by the clamp. However, once the embracing region 3 has an area lesser than that of the cross-section of the hose, one should first force the first and second fixation portions 5, 5' for the purpose of enlarging the area of said region. This is carried out by means of the handling ends 7, 7', which are moved by the user. This movement may be easily effected by hand, dispensing with special tools or equivalent steps carried out mechanically. Then, both first and second fixation portions 5, 5' move angularly with respect to the point at which they are fixed to the body 2.

While the user remains holding the handling ends 7, 7' (which forces the first and second fixation portions 5, 5', causing them to take an antinatural positioning and exert force in the direction of return to the rest position), enlarging the area of the embracing region 3, he introduces the hose through this area positioning it correctly until the free end thereof is embraced by the clamp, as already mentioned.

Then, the user releases the ends 7, 7', and both first and second fixation portions 5, 5', which move to return to the natural position, meet the hose, which has a cross-section area larger than that of the initial embracing region 3. In this way, both portions 5,5' remain forcing the hose, so that this remains fixed to the device 1. This prevents the device 1 from rotating about the hose, thus fulfilling its purpose.

In the preferred embodiment and in the first alternative embodiment. In order to position the hose, one has to press the ends 7,7' approaching them to each other, which brings about an enlargement of the area of the embracing region 3. In the preferred embodiment, the ends 7, 7' are substantially triangular, projecting with respect to the respective first and second fixation portions. This results in a big displacement of these portion from each other, much bigger than that which is possible without the use of the ends 7,7' thus configured, thus brining about an enlargement of the area of the embracing region 3.

Alternatively, however, the device 1 may be conceived with ends 7,7' that should be moved away from each other in order to bring about an enlargement of said area of the embracing region 3.

Then, the user has only to position the hose correctly on the nozzle where will be installed and tighten the clamp, fixing it properly. One the clamp is fixed on the body 2 by means of the protrusions 6, the device 1 has fulfilled its role of preventing the claim from rotating with respect to the hose before it is tightened.

One should prevent the clamp from rotating on the hose, because, if the clamp rotates while it is being mounted, it may be in a position that makes the tightening thereof difficult, thus bring troubles.

A preferred embodiment having been described, one should understand that the scope of the present invention embraces other possible variations, being limited only by the contents of the accompanying claims, which include the possible equivalents.

The invention claimed is:

1. A device for fixing a clamp to a hose, comprising a body and a hose-fixing component provided with a hose-embracing region, the hose-fixing component comprising a first open fixation portion and a second open fixation portion wherein the first and second open fixation portions have a handling end and are positioned adjacent to each other, jointly define the hose-embracing region and are moveable from an initial position varying the extent of the embracing region wherein said first open fixation portion and said second open fixation portion each have a semicircular shape with a degree measure in excess of 180 degrees.

2. The device according to claim 1, wherein the first open fixation portion are arranged axial parallelism and axial alignment.

3. The device according to claim 1, wherein the second open fixation portion is positioned in axial parallelism and adjacent to the first open fixation portion.

4. The device according to claim 1, wherein the first open fixation portion has a first end region associated to the body and the second open fixation portion comprises a first end region associated to the body, first end region of the first open fixation portion and the first end region of the second open fixation portion being positioned face-to-face to each other.

5. The device according to claim 4, wherein the first and second fixation portions angularly movable with respect to the point at which they are fixed to the body.

6. The device according to claim 5, wherein an intermediate region of the second open fixation portion has a deviation.

7. The device according to claim 1, wherein the body is provided with at least one protrusion for fixing the clamp.

8. The device according to claim 7, wherein the body is open.

9. A device for fixing a clamp to a hose comprising a body and a hose-fixing component provided with a hose-embracing region
and comprising, a first open fixation portion and a second open fixation portion. wherein the first and second open fixation portions arc arranged in axial parallelism and axial alignment, have a handling end and are positioned adjacent to each other, jointly define the hose-embracing region and are moveable from an initial position varying the extent of the embracing region wherein the first open fixation portion and the second open fixation portion are each semicircular in shape and have a degree measure in excess of 180 degrees.

10. The device according to claim 9, wherein the body is semicircular.

11. The device according to any one of claims 1-3,4-5,6,7, 8,10 further comprising a hose.

12. The device according to claim 9, wherein the second open fixation portion is positioned in axial parallelism with and adjacent to the first open fixation portion.

13. The device according to claim 12, wherein the first and second open fixation portions are semicircular, the first and second fixation portions being angularly movable with respect to the point at which they are fixed to the body.

14. The device according to claim 13, wherein an intermediate region of the second open fixation portion has a deviation.

15. A device for fixing a clamp to a hose, said device comprising:
   a body dimensioned to receive a clamp, and
   a hose fixing component integrally formed with said body, said hose fixing component including a first fixation arm and a second fixation arm, each said fixation arm having a handle on an end thereof, said fixation arms being positioned adjacent one another, said second fixation arm being positioned physically intermediate said first fixation arm and said body.

* * * * *

UNITED STATES PATENT AND TRADEMARK OFFICE
CERTIFICATE OF CORRECTION

PATENT NO. : 7,427,083 B2  Page 1 of 1
APPLICATION NO. : 10/503374
DATED : September 23, 2008
INVENTOR(S) : Antonio Carlos Pina et al.

It is certified that error appears in the above-identified patent and that said Letters Patent is hereby corrected as shown below:

| | | |
|---|---|---|
| COLUMN 1, | LINE 42, | change "opened" to --be opened-- |
| COLUMN 1, | LINE 45, | change "fixe" to --fix-- |
| COLUMN 2, | LINE 52, | change "of A device" to --of a device-- |
| COLUMN 3, | LINE 55, | change "FIG. 1," to --FIGS. 1-5,-- |
| COLUMN 4, | LINE 46, | change "portion" to --portions-- |
| COLUMN 4, | LINE 50, | change "FIG." to --FIGS.-- |
| COLUMN 4, | LINE 59, | change "transversal" to --transverse-- |
| COLUMN 4, | LINE 59, | change "portion configuring" to --portion 5' configuring-- |
| COLUMN 5, | LINE 63, | change "where will" to --where it will-- |
| CLAIM 2, COLUMN 6, | LINE 23, | change "are arranged axial" to -- is arranged in axial-- |
| CLAIM 5, COLUMN 6, | LINE 35, | change "portions angularly" to --portions are angularly-- |
| CLAIM 9, COLUMN 6, | LINE 49, | change "arc" to --are-- |

Signed and Sealed this
Third Day of July, 2012

David J. Kappos
*Director of the United States Patent and Trademark Office*